United States Patent [19]
Fage

[11] 4,129,269
[45] Dec. 12, 1978

[54] SINGLE-SKIN THRUST REVERSER FOR AIRCRAFT JET ENGINES

[75] Inventor: Etienne Fage, Jouy en Josas, France

[73] Assignee: Astech, Meudon la Foret, France

[21] Appl. No.: 784,562

[22] Filed: Apr. 4, 1977

[30] Foreign Application Priority Data

Apr. 14, 1976 [FR] France .................. 76 10968

[51] Int. Cl.² .............. B64C 15/06; B64D 33/04
[52] U.S. Cl. ................ 244/110 B; 60/226 A; 60/230; 239/265.19; 239/265.37
[58] Field of Search ............... 244/110 B, 12.5, 53 R; 60/226 A, 229, 230; 239/265.19, 265.33, 265.37, 265.25, 265.31, 265.35, 265.29

[56] References Cited

U.S. PATENT DOCUMENTS

| | | | |
|---|---|---|---|
| 2,620,622 | 12/1952 | Lundberg | 239/265.37 |
| 3,532,275 | 10/1970 | Hom et al. | 239/265.37 X |
| 3,550,855 | 12/1970 | Feld et al. | 60/230 X |
| 3,640,468 | 2/1972 | Searle et al. | 239/265.35 X |
| 4,005,836 | 2/1977 | Mutch | 239/265.19 |

Primary Examiner—Barry L. Kelmachter
Attorney, Agent, or Firm—Merriam, Marshall & Bicknell

[57] ABSTRACT

Thrust reverser for a jet engine of an aircraft, comprising two symmetrical doors mounted to pivot about an axis which is transverse and substantially diametrical with respect to the jet of the engine and which is disposed downstream of the jet exhaust pipe thereof, the doors being adapted to occupy a folded or stowed position in which they form part of the fairing of the engine or fuselage of the aircraft, or an unfolded or opened out position for which they are disposed transversely with respect to the jet. According to the invention, each of the doors is formed by a single skin which is at least substantially hemi-truncated in shape.

6 Claims, 8 Drawing Figures

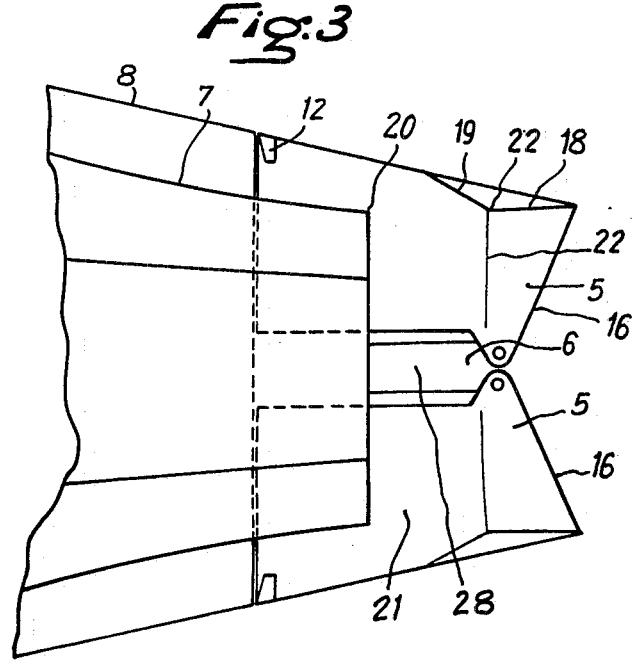
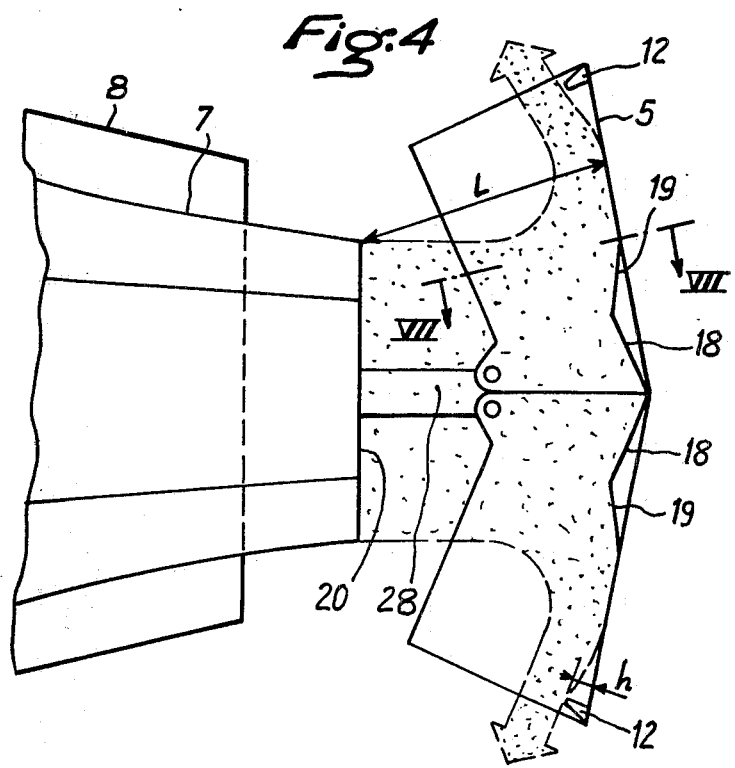

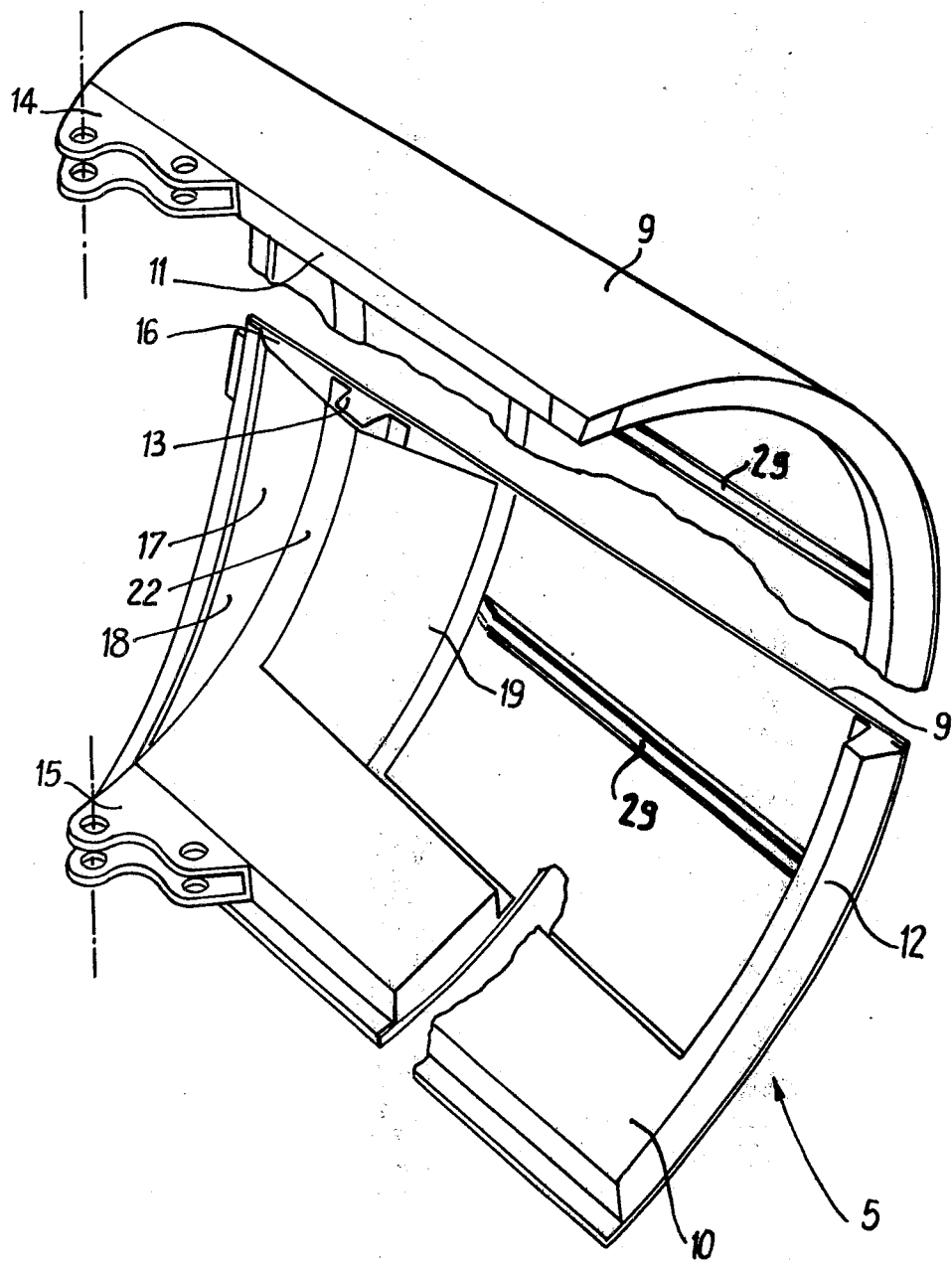

SINGLE-SKIN THRUST REVERSER FOR AIRCRAFT JET ENGINES

The present invention relates to a thrust reverser for a jet engine, with or without by-pass of the main jet, mounted in particular on an aircraft.

With a view to shortening the distance run by an aircraft between landing and stopping or to increasing safety when braking on a damp or icy runway, a reverser is known to be used on jet-engined aircraft, which produces a braking thrust.

To this end, a thrust reverser is already known which comprises two symmetrical doors pivotally mounted about an axis which is transverse and substantially diametrical to the jet of said engine and which is disposed downstream of the jet exhaust pipe thereof, said doors occupying a folded or stowed position in which they form part of the fairing of said engine or fuselage of the aircraft, or an unfolded or opened out position in which they are disposed transversely with respect to said jet.

In this known reverser, each door is "double-skinned", and in stowed position the inner skins of the two doors form a convergent duct followed by a quasi-cylindrical portion, connected by a ridge, adjacent the edge of the nozzle of the engine.

It is an object of the invention to provide a structure of doors for a thrust reverser enabling the dimensions of said doors to be reduced, the weight of said reverser to be lightened and the aerodynamic characteristics of the reversed jet to be improved.

According to the invention, this object is attained in that each of said doors is formed by a single skin or thin wall which is at least substantially hemi-truncated in shape.

As will be seen hereinafter, such a structure makes it possible to increase the critical dimension for the flow of reversed jet, the door dimensions being equal, and thus to reduce the length of the doors, the critical dimension being equal. This results in a weight saving, an improved rigidity of the reverser and a reduction of the drag.

As used herein, the term "critical dimension" refers to the smallest distance separating the exhaust end of the jet tube of the engine and the thrust reverser, through which the deflected exhaust gases flow when the reverser is in use, which can be used without reducing the mass flow through the engine or causing the engine to overheat. A discussion of the significance of the "critical dimension" is found in NACA Research Memorandum E55E18, "Performance Characteristics in Hemispherical Target-type Thrust Reversers", by Fred W. Steffen et al., Sept. 27, 1955.

Said substantially hemi-truncated skin is advantageously reinforced on its concave face, at least near its rectilinear longitudinal edges and its circular leading edge, by stiffening sections, taking the shape of said concave face and projecting with respect thereto.

Moreover, said substantially hemi-truncated skin preferably comprises on the rear side a crescent-shaped extension, which is separated from the rest of said skin, on the concave face thereof, by a stiffening arc.

In the thrust reverser according to the invention, the concave face of the at least substantially hemi-truncated skin is provided, near the stiffening arc, with a lining, which, in section through a diametrical plane of said skin, is ridged in cross-section, of which ridge the point furthest away from said skin is located at the level of said stiffening arc, this lining covering, on one side of said arc, said crescent-shaped extension, and on the other side, less than half of the length of the concave face separating the stiffening arc from the leading edge of the door. In this way, the linings of the doors participate, in unfolded position, in the division and lateral guiding of the reversed jet. Said latter may, moreover, be controlled by the height of the projection of the stiffening sections with respect to the concave skin of the door being adjusted to perfect the flow of the reversed jet when the doors are in unfolded position.

When the doors are in stowed position, the portions of lining covering the crescent-shaped extensions form a cylindrical or slightly divergent exhaust pipe. In this latter case, the angle at the vertex of the divergent duct is advantageously smaller than six degrees.

In this way, in the thrust reverser according to the invention, said exhaust pipe is separated from the nozzle of the engine by an empty annular space, this facilitating the positioning of the doors.

The invention will be more readily understood on reading the following description with reference to the accompanying drawings, in which:

FIG. 2 illustrates in perspective and with parts torn away, one of the doors of the thrust reverser shown in FIG. 1.

FIG. 3 illustrates, in schematic longitudinal section, the thrust reverser according to the invention is stowed position.

FIG. 4 illustrates, in schematic longitudinal section, the thrust reverser according to the invention, in unfolded or open position.

In these Figures, like elements are designated by like references.

Figure 1:
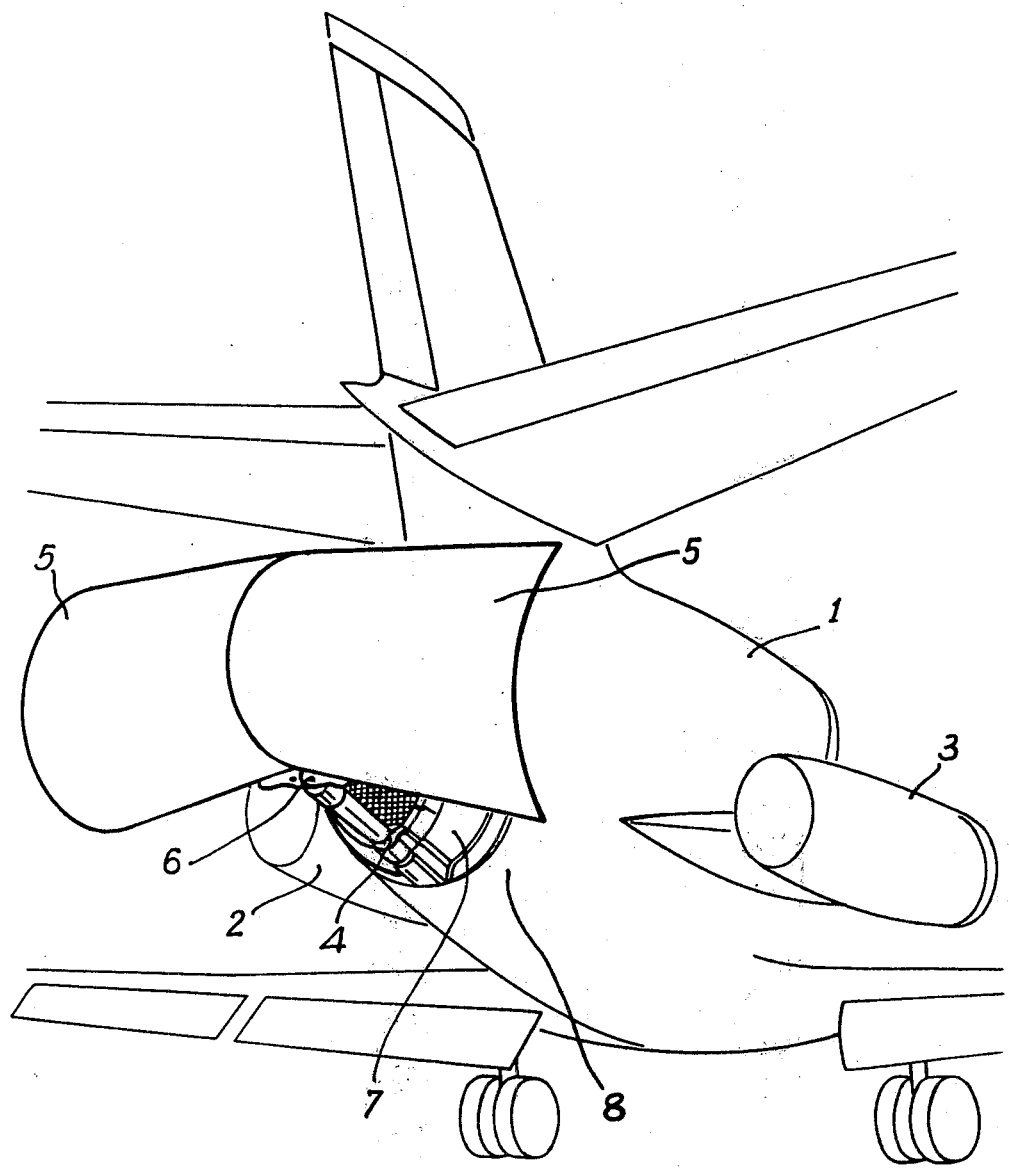
FIG. 1 shows the rear part of an aircraft, the central engine of which is provided with a thrust reverser according to the invention.

Referring now to the drawings, FIG. 1 shows the rear 1 of an aircraft, comprising three jet engines 2, 3 and 4, namely two side engines 2 and 3 and a central one 4. This engine 4 is to a large extent hidden by a thrust reverser, comprising two reverser doors 5, hinged about a pivot 6 enabling said doors to pivot about a vertical axis disposed downstream of the fan nozzle of the engine 4. This pivot 6 is mounted on the fan channel 7 of said nozzle.

In FIG. 1, the reverser doors are shown in unfolded position, i.e. in a position adapted to reverse the jet, whilst in FIG. 3 they are shown to be in stowed position. In this latter case, they are in line with the fairing 8 of the engine 4.

The reverser doors 5 are identical and interchangeable, so as to be adapted to be mounted equally well on the left or on the right.

As shown in FIG. 2, each door 5 is formed by a thin wall 9, generally called a skin, at least approximately in the form of half a frustum of a cone. On its concave inner face, the skin 9 is stiffened at its periphery by a frame formed of longitudinal beams 10 and 11 along its rectilinear edges and arcs 12 and 13 near its leading and rear curvilinear edges. It may also comprise additional small longitudinal stiffeners 29.

The beams 10 and 11 and arcs 12 and 13 are constituted by sections of which the cross-section is in the form of a U, a Ω or the like and are fixed on the inner concave face of the skin 9 by their edges.

The skin 9 and the beams and arcs 10 to 13 may be made of "INCONEL 625" (Registered Trade Mark) or any other suitable refractory alloy and these different elements of a door 5 may be assembled by riveting.

Two pivot fittings 14 and 15 are arranged at the rear arc 13, for attachment to the hinge device 6. The fittings 14 and 15 are located along the rectilinear edges of the door 5. At the leading edge of each door 9, stiffening arc 12 and the leading edge of skin 9 adjacent thereto are substantially semi-circular and lie in a plane which is generally perpendicular to the longitudinal edges of the door. At the trailing edge of each door 9, stiffening arc 13 is semi-circular and is also generally perpendicular to the longitudinal edges of the door. The trailing edge of skin 9 extends rearwardly beyond arc 13 and lies a plane which is oblique to the longitudinal edges of the door. Between the trailing edge of the skin 9 and stiffening arc 13 there is accordingly defined a crescent-shaped section 16 of the skin, having two cusps which lie at pivot fittings 14 and 15. The maximum width (i.e., the distance between the trailing edge and arc 13) of cresent-shaped section 16 lies in the axial plane of symmetry of the skin 9, i.e., the plane including the longitudinal axis of the door which divides the skin into symmetrical halves.

Arc 13 is covered by a V-shaped arcuate lining 17 having inclined faces 18 and 19 which intersect to form a trough, the ridge of arc 13 nesting in the trough so formed. Face 18 extends from one side of arc 13 to cover substantially the entire inner face of projection 16, while face 19 extends from the other side of arc 13 to cover only a minor part (less than half) of the inner face of skin 9.

When the doors 5 are in stowed position, the inclined walls 18 come in line with the outer edge 20 of the fan duct of the engine 4. (cf. FIG. 3). On the other hand, since the inclined face 19 of the lining covers the inner concave face of the skin 9 only partially, there is an annular space 21 between the edge 20 of the fan duct and the ridge 22 (corresponding to the arc 13) of the lining 17, which ridge corresponds to the joining of inclined faces 18 and 19.

It will be noted that the aerodynamic loads applied to the doors 5, when they are unfolded, are transmitted to the pivot fittings 14 and 15. These may be constituted by castings made of a special stainless steel.

The structure of a door 5 comprising a skin 9 and peripheral stiffeners 10 to 13 gives this door an excellent rigidity in flexion and in torsion. As will be seen hereinbelow, in addition to its structural function of rigidification, the frame 10 to 13 allows the reversed jet of the gases leaving the engine 4 to be best deflected, due to the optimum choice of the height of said frame with respect to the inner concave face of the skin 9.

Figure 5:
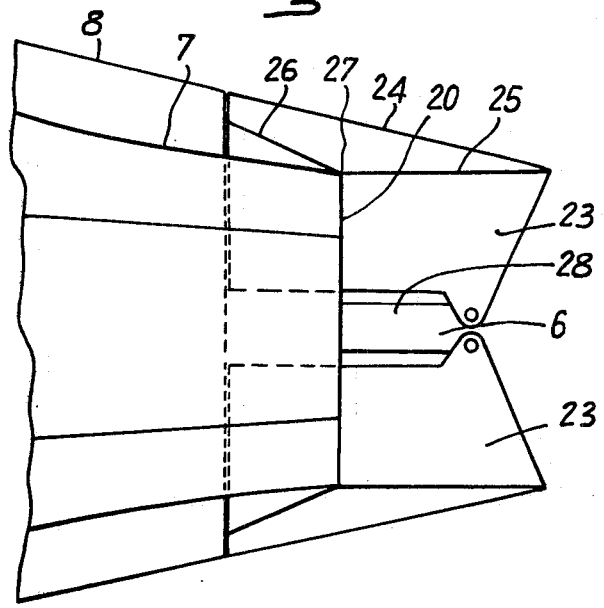
FIG. 5 illustrates, in schematic longitudinal section, a known thrust reverser in stowed position.

FIG. 5 shows a known thrust reverser provided with doors 23, also hinged about a pivot 6, but of which the structure is a so-called "double-skin" structure, since they are constituted by an outer truncated skin 24 and an inner ridged skin, composed of a quasi-cylindrical part 25 and a conical part 26 connected along a circular ridge 27. In stowed position (FIG. 5), the circular ridge 27 is adjacent the edge 20 of the fan and the part 25 comes in line therewith. There is no annular space 21 in this case.

Figure 6:
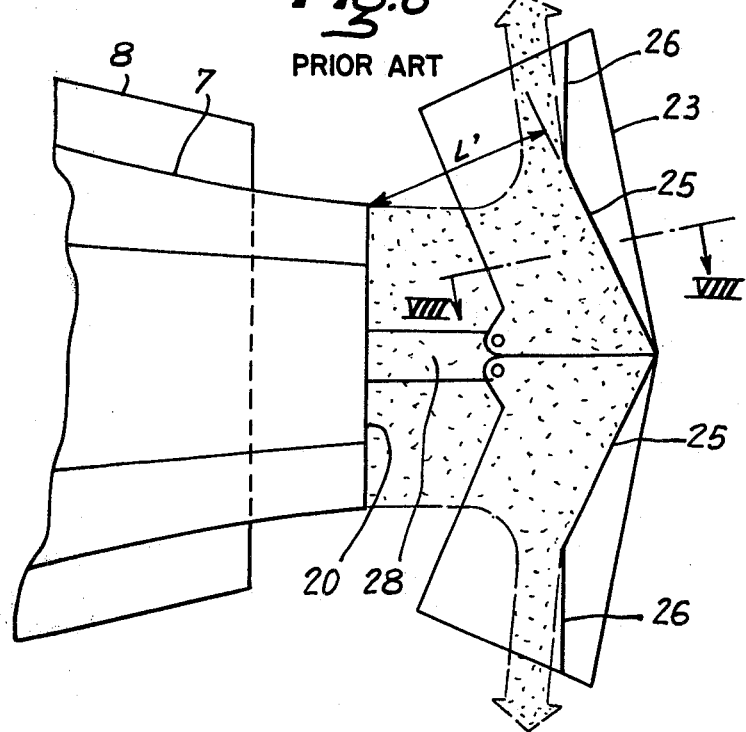
FIG. 6 illustrates, in schematic longitudinal section, the known thrust reverser in unfolded or open position.

The major advantage of the thrust reverser according to the invention over the known thrust reverser shown in FIG. 5 is clearly seen on comparing FIGS. 4 and 6, in which the two reversers have been shown on the same scale, in stowed position.

The critical dimension L for the reversed flow in the reverser according to the invention is thus noted to be substantially larger, for equal dimensions of doors 5 and 23, than the corresponding critical dimension L' in the known reverser. For critical dimensions L and L' of the same order, i.e. for a similar action of the two reversers, doors 5 which are smaller than doors 23 may be used, due to the invention.

This is very important. In fact, apart from the obvious weight saving, this reduction in the doors' length beings numerous advantages. A fixed hinge element for the doors of the reverser is known to extend the fairing downstream of the exhaust plane of the fan channel and such an extension is generally known to be accompanied by an increase in the external drag, especially in supersonic flight. Further, the thrust reverser according to the invention enables the influence on the drag to be reduced. Furthermore, the doors being smaller, the hinge 6 thereof is less remote from the edge 20 of the fan duct and its support arm or arms 28 can be shorter. This results in the hinge system of the doors being more rigid and less sensitive to vibrations.

Moreover, the presence of the annular space 21 between the edge 20 and the ridge 22 improves the positioning of the doors. In particular, even when the axis of the fairing 8 does not coincide with the axis of the nozzle, it enables identical doors 5 to be adapted whilst respecting the continuity of the external lines.

Figure 7:
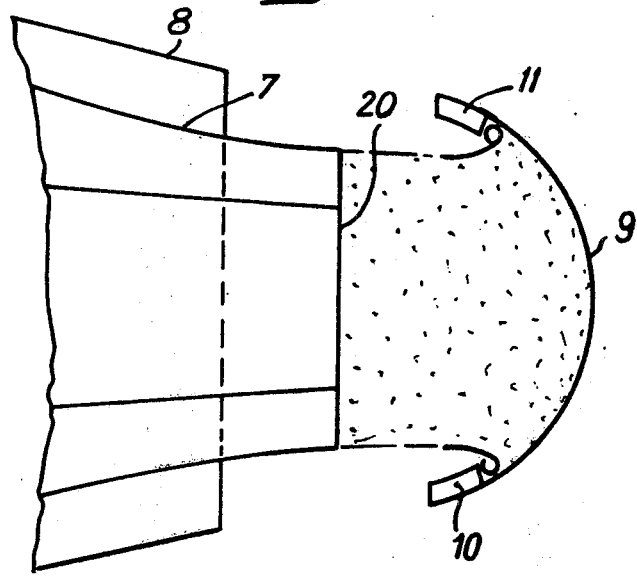
FIG. 7 is a section along the line VII—VII of FIG. 4.
Figure 8:
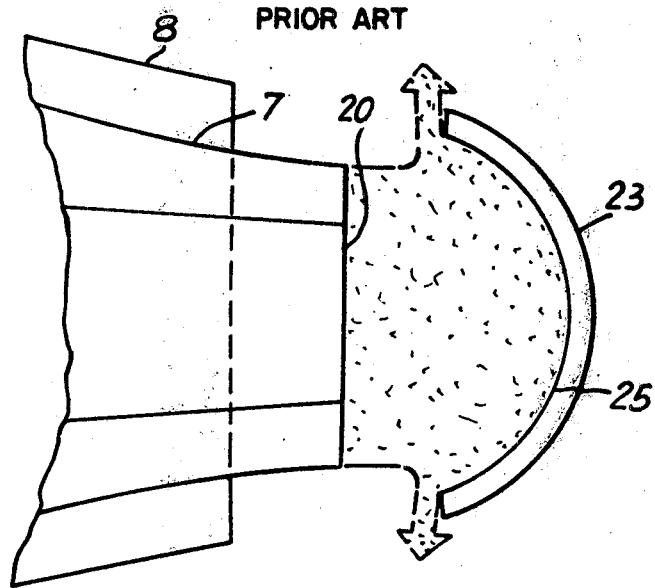
FIG. 8 is a section along the line VIII—VIII of FIG. 6.

Finally, as a comparison between FIGS. 4 and 7 on the one hand and FIGS. 6 and 8 on the other hand shows, which Figures schematically show the jets leaving the engine, the reverser according to the invention presents aerodynamic advantages.

These FIGS. 4 and 7 show that in the reverser according to the invention, the stiffener arc 12 and the longitudinal beams 10 and 11, due to the projection that they form with respect to the inner face of the curved skin 9, enable the reversed flow to be canalized (avoiding side spillage) and to be controlled. By adjusting the height (or projection) h of the arc and the beams 10 and 11 with respect to said inner face of the skin 9, it is possible to perfect the control of the reversed flow.

Experience has shown that, on condition that the exhaust section of the jet (delimited by the curved inclined faces 18) is slightly larger than the section of the nozzle at the edge 20, the presence of the annular space 21 does not, in direct jet, cause any measurable loss of power of the engine 4. This is due to the fact that, in operation, a "fluid wall" is established between the edge 20 and the ridge 22, the exact form of which adapts itself to the conditions of flight and functioning of the engine.

A good geometric adaptation will thus determine, at low flight velocities (take-off and landing in particular), a depression in the annular space 21, which will cause a small additional flow to be drawn along the front arc 12. This depression will progressively fill so that it will be weak or nil at cruising speed and that it will never be necessary to install a seal along the arc 12.

However, it is important that the geometry be adapted to each particular case. If the faces 18 formed an exhaust pipe which is too small, too large or too divergent, noticeable losses of thrust would appear at certain speeds.

Experience has shown that, to this end, the angle of the divergent duct had to be smaller than 6°.

What is claimed is:

1. A thrust reverser adapted for use with an aircraft jet engine having a jet exhaust pipe from which a jet of gaseous products emerges, said reverser comprising two symmetrical doors, each of which is at least substantially hemi-truncated in form, having opposed arcuate leading and trailing edges and opposed rectilinear side edges, said doors being mounted to pivot about an axis adjacent said trailing edges, said axis being transverse and substantially diametrical with respect to the jet of said engine, and which is disposed downstream of the jet exhaust pipe thereof, each of said doors comprising a thin wall having a concave inner face and a convex outer face, and elongated reinforcing members attached to said concave face adjacent the arcuate leading and trailing edges and the rectilinear side edges thereof, said reinforcing members projecting inwardly from said concave face, at least half of said inner concave face being exposed to contact with said jet, said wall having a crescent-shaped section at its rearward end, defined by the trailing edge of said wall and said reinforcing member adjacent thereto, said section having an inner concave and an outer convex face which form continuations of the concave and convex faces of said wall, an arcuate lining having two faces which intersect to form a trough having an approximately V-shaped cross-section, said lining spanning the reinforcing member adjacent the trailing edge of said door with said reinforcing member in the trough of said lining, said lining faces comprising a rearward face covering substantially all of the concave face of said crescent-shaped section and a forward face covering less than half of the concave face of said wall, each door being movable between a first, folded position in which said outer face forms an extension of a section of said aircraft, and a second, unfolded position in which said outer face is disposed transversely with respect to said jet.

2. A thrust reverser in accordance with claim 1 in which the height of said reinforcing members above the concave face of said wall is adapted to control and regulate in part the reverse flow of said jet when said doors are in said unfolded position.

3. A thrust reverser in accordance with claim 1, wherein, when the doors are in said folded position, the rearward faces of said linings form a cylindrical jet exhaust pipe.

4. A thrust reverser in accordance with claim 3 wherein said jet exhaust pipe formed by said rearward faces is separated from the jet exhaust pipe of said engine by an empty annular space defined in part by the concave faces of said walls.

5. A thrust reverser in accordance with claim 1, wherein, when said doors are in said folded position, the rearward faces of said linings form an outwardly divergent jet exhaust pipe having an angle at its vertex which is smaller than 6°.

6. A thrust reverser in accordance with claim 5 wherein said jet exhaust pipe formed by said rearward faces is separated from the jet exhaust pipe of said engine by an empty annular space defined in part by the concave faces of said walls.

* * * * *